March 11, 1947.  C. C. VAN NUYS  2,417,279
SEPARATION OF THE CONSTITUENTS OF GASEOUS MIXTURES
Filed July 22, 1944
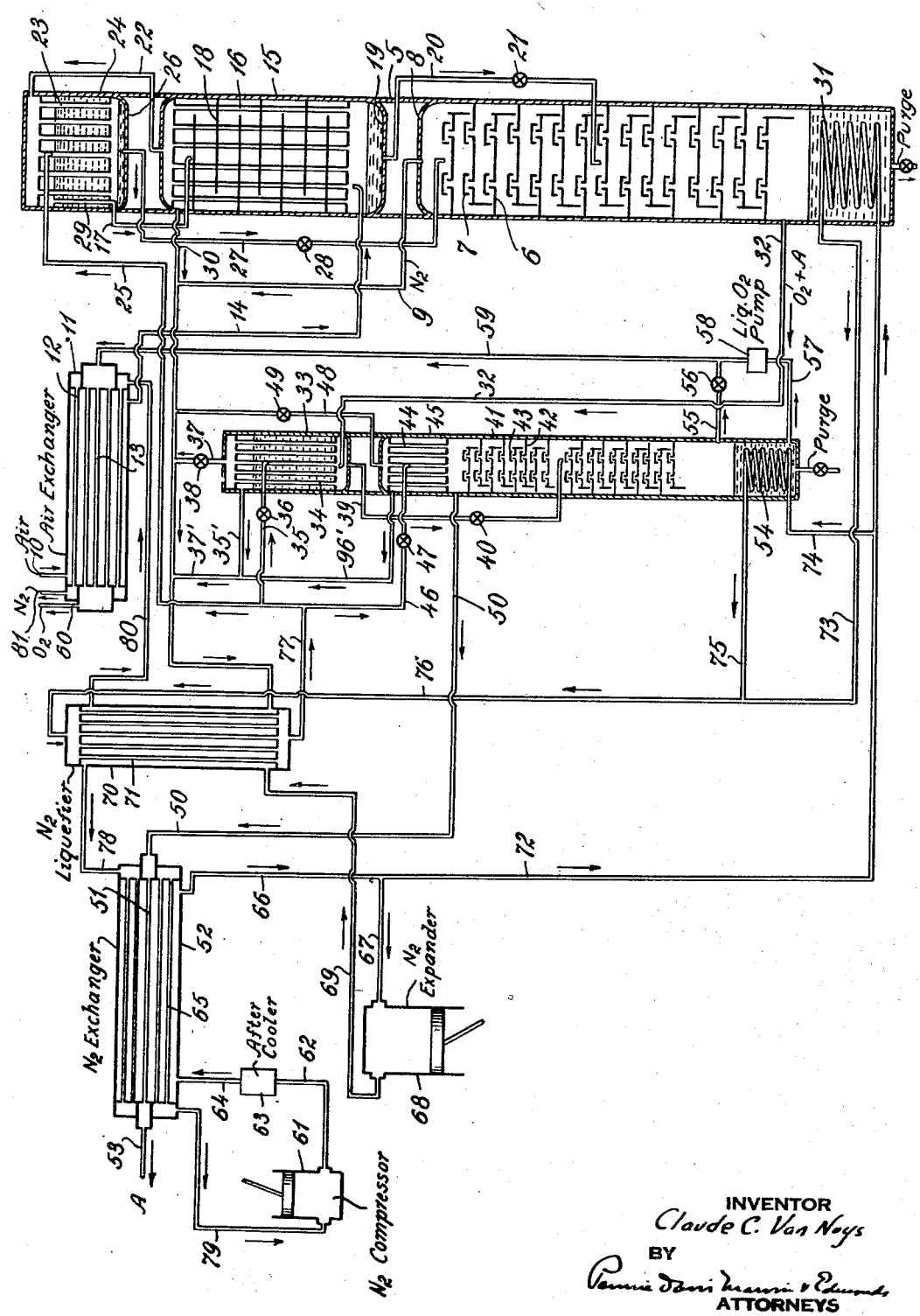
INVENTOR
Claude C. Van Nuys
BY
Pennie Davis Marvin & Edmonds
ATTORNEYS Patented Mar. 11, 1947

2,417,279

UNITED STATES PATENT OFFICE 2,417,279

SEPARATION OF THE CONSTITUENTS OF GASEOUS MIXTURES

Claude C. Van Nuys, Greenwich, Conn., assignor to Air Reduction Company, Incorporated, New York, N. Y., a corporation of New York Application July 22, 1944, Serial No. 546,153

8 Claims. (Cl. 62—175.5)

This invention relates to the liquefaction and separation of ternary gaseous mixtures for the purpose of recovering the constituents thereof. The method is particularly adapted for the separation of the principal constituents of air, although it may be applied to other ternary mixtures, the constituents of which have different boiling points.

Various methods for the recovery of the constituents of ternary gaseous mixtures have been proposed heretofore. These methods may accomplish the desired purpose, but are subject to certain disadvantages, including incidental losses and particularly the cost of the energy employed in compressing the gaseous mixture.

It is the object of the present invention to provide a highly efficient method involving minimum expense whereby the constituents of a gaseous mixture such as air may be recovered in a commercially practicable manner.

Another object of the invention is the provision of a method whereby the three constituents of the mixture are separated and recovered in substantial purity.

A further object of the invention is the economical utilization of an external cooling system to effect the necessary liquefaction of the ternary gaseous mixture prior to separation of the constituents thereof.

Other objects and advantages of the invention will be apparent as it is better understood by reference to the following specification and the accompanying drawing, which illustrates diagrammatically an apparatus adapted for use in practising the invention.

In the drawing, no attempt has been made to illustrate those details of liquefaction apparatus which are well known in the art, the purpose of the drawing being merely to assist the reader to a complete comprehension of the essential features of the invention. Devices well known in the art may be utilized, and the form and arrangement of the apparatus will conform in general to the means commonly employed to accomplish similar functions.

In order to clarify the description, reference will be made to a ternary mixture such as air, consisting of nitrogen, oxygen and argon. The constituents neon, krypton and xenon occur in such relatively small amounts that no consideration need be given thereto in respect to the separation hereinafter described. Ternary mixtures having constituents the physical characteristics of which are related as in the case of nitrogen, oxygen and argon, may be treated similarly to effect the desired separation.

It is an important advantage of the present invention that the three constituents are each recovered in substantial purity and that all of such constituents present in the gaseous mixture treated are recovered. A further advantage arises from the fact that the gaseous mixture treated, for example air, is not utilized to any extent to maintain the refrigeration necessary to the successful operation of the procedure. A separate refrigeration cycle is utilized. Hence the gaseous mixture, for example air, entering the system need be compressed only to relatively low pressure, for example a pressure not exceeding 5 atmospheres absolute. Many of the losses incidental to procedures as previously known have been due to the utilization of the gaseous mixture undergoing separation as the refrigerating medium.

In the application of the invention to the separation of the constituents of air, three products are obtained; namely, (1) substantially pure nitrogen with only minute percentages of oxygen and practically no argon; (2) oxygen of industrial purity containing less than 0.5% of impurities of any sort; and (3) practically all of the argon originally present in the air with only small percentages of oxygen and no nitrogen.

To attain this result, the separation is effected in a relatively simple manner. After initial compression to a relatively low pressure, the air is cooled in exchangers by heat interchange with products of the separation. Thereafter it is separated into two liquid fractions by heat exchange with liquid nitrogen and the vapor therefrom provided as hereinafter described. The separation affords a fraction enriched in oxygen, usually containing approximately 40% of oxygen, and a liquid consisting of nitrogen. The two liquids are then rectified to afford an effluent consisting of pure nitrogen and a vapor phase containing all of the oxygen, all of the argon, and a small proportion of nitrogen. At this point the nitrogen effluent is withdrawn as one of the products to be supplemented with nitrogen recovered from the vapor phase consisting principally of oxygen and argon.

The vapor phase is withdrawn and subjected initially to selective liquefaction by heat exchange with liquid nitrogen. By this means most of the residual nitrogen is separated from a liquid consisting principally of oxygen and argon which may, however, still contain some slight proportion of nitrogen. The separated nitrogen is withdrawn and added to the effluent from the initial rectification.

The liquid consisting of oxygen and argon is then subjected to an auxiliary rectification. The vapor at the top of the rectification consists of argon which may still include a slight percentage of nitrogen as an impurity. It is, therefore, subjected to selective condensation by heat exchange with liquid nitrogen which affords a reflux liquid consisting of pure argon. The residual nitrogen which is thus separated is delivered to the effluent from the primary rectification. The provision of the reflux liquid consisting of pure argon assures a pure argon vapor which may be withdrawn as one of the products from the auxiliary rectification. The liquid accumulating at the bottom of the auxiliary rectification is pure oxygen. It may be withdrawn as a liquid or vaporized and delivered as a vapor from the rectification.

As will be readily apparent from the foregoing description, the three constituents are recovered in substantial purity. Moreover, none of the constituents is lost, since there is no impure waste gas or mixture of gases which must be discharged from the system. The procedure insures an efficient and economical separation and recovery of the several constituents of the mixture.

As already indicated, the method does not rely upon compression of the gaseous mixture to be separated to afford the necessary refrigeration. The liquid nitrogen which is utilized to maintain the requisite low temperatures at the places required in the system is provided by compression of nitrogen which is circulated in an independent cycle. After compression and cooling, the nitrogen is liquefied. The liquid nitrogen is delivered to the several condensers where it performs its function in cooling the gaseous mixture and the constituents thereof. The liquid nitrogen is vaporized, and the vapor, after giving up its cold, is recompressed and again utilized for refrigeration of the system. Although it is not essential, a portion of the nitrogen may be expanded from its initial pressure in a suitable expansion engine or turbine to afford the additional refrigerative effect, depending upon expansion of the gas with external work.

An important advantage of the present procedure arises from the fact that effluent nitrogen from the primary rectification is mingled with the nitrogen of the independent cycle and only a sufficient amount of the cold nitrogen is delivered through the exchanger for heat exchange with the incoming gaseous mixture. This avoids premature condensation of the entering gaseous mixture and also amply makes up for any loss of nitrogen in the independent cycle in which the nitrogen is liquefied to afford refrigeration at various points in the system.

The details of the invention will be better understood by reference to the following description and the drawing, in which 5 indicates a rectification column having trays 6 and the usual bubble caps 7. The column is closed at its top by a diaphragm 8, and an outlet 9 is connected thereto to deliver the effluent nitrogen which is separated in the rectification of air.

The air is introduced, after initial compression and cooling, through a pipe 10 to an exchanger 11 and circulated about tubes 12 and 13 therein, being cooled by nitrogen delivered to the exchanger as hereinafter described. The air passes through a pipe 14 to a condenser 15 above the column 5 and passes through tubes 16 thereof in heat exchange relation with liquid nitrogen and vapors thereof supplied through a pipe 17. The liquid nitrogen flows over baffles 18 and is vaporized while the air flowing through the tubes 16 is subjected to selective liquefication. As a result, liquid rich in oxygen is delivered to a collector 19 and thence through a pipe 20 and pressure reducing valve 21 to an intermediate level of the column 5.

The residue from the condenser 15 is delivered through a pipe 22 to the tubes 23 of a condenser 24 which is supplied with liquid nitrogen by a pipe 25. The residual nitrogen in the tubes 23 is liquefied and collected in a collector 26. It is delivered through a pipe 27 and pressure reducing valve 28 to the top of column 5, thus affording reflux nitrogen for the primary rectification. The surplus liquid nitrogen and vapors therefrom escape from the condenser 24 through an overflow 29 and thence to the pipe 17, which delivers the liquid and vapors to the condenser 15. The nitrogen vapor from the condenser 15 is withdrawn through a pipe 30, to which the pipe 9 is connected, so that the effluent from the primary rectification is mingled with the nitrogen vapor from the condenser 15. The vapor is cold and is utilized as hereinafter described as a cooling medium for nitrogen undergoing liquefaction in the independent nitrogen cycle.

The liquid accumulating in the bottom of the column 5, consisting principally of oxygen and argon, is vaporized by gaseous nitrogen circulating through a coil 31 as hereinafter described, to afford vapor in the column and also vapor which is withdrawn through a pipe 32. The vapor thus withdrawn includes all of the oxygen and argon initially present in the air treated. It is delivered to a condenser 33 and passes upwardly through tubes 34 thereof, being subjected to heat exchange with liquid nitrogen supplied through a pipe 35 and throttle valve 36. In thus passing through the tubes 34, the gaseous mixture is liquefied except for residual nitrogen which escapes through a pipe 37 controlled by a valve 38. The pipe 37 is connected to the pipe 30 so that the residual nitrogen joins the effluent from the primary rectification and the nitrogen vapor from the condenser 15. The liquid consisting of oxygen and argon with possibly some relatively small proportion of nitrogen is delivered through a pipe 39 and valve 40 to an auxiliary rectifier 41 which is provided with the usual trays 42 and bubble caps 43.

As the liquid flows downwardly through the column, it is gradually enriched in oxygen, whereas the vapors rising through the column are enriched in argon and carry also any small proportion of nitrogen which may be present. The vapors pass upwardly through tubes 44 of a condenser 45 which is supplied with liquid nitrogen through a pipe 46 and valve 47. The liquid, consisting of argon, flows backwardly onto the upper tray of the column 41, and the nitrogen escapes through a pipe 48 and valve 49 and thence to the pipe 30 where it mingles with the nitrogen therein.

Owing to the provision of the pure argon reflux derived from the tubes 44, the vapor withdrawn through a pipe 50 is pure argon. It is delivered to the tubes 51 of an exchanger 52 where it serves to cool nitrogen in the independent cycle as hereinafter described. The argon is withdrawn through a pipe 53 and delivered to suitable storage receptacles. It affords one of the products of the operation.

The liquid accumulating in the bottom of the column 41 is vaporized by nitrogen passing through a coil 54, supplied as hereinafter described, to afford the vapor necessary in the column, and if desired to permit withdrawal of oxygen vapor through a pipe 55 and valve 56. Liquid oxygen may, however, be withdrawn through a pipe 57 and delivered by a pump 58 to a pipe 59 which carries the oxygen to the tubes 13 of the exchanger 11. The oxygen is withdrawn from the exchanger through a pipe 60 and delivered to suitable storage receptacles affording the second product of the operation.

To provide necessary refrigeration, nitrogen is compressed in a compressor 61 and is delivered by a pipe 62 to a cooler 63 and thence by a pipe 64 to the exchanger 52 in which it circulates about tubes 51 and 65 in heat exchange with argon and cold nitrogen returning in the cycle. The nitrogen is delivered from the exchanger through a pipe 66 and a portion thereof may, if desired, be diverted through a pipe 67 to an expansion engine 68 where the nitrogen is expanded with external work and further cooled. The expanded nitrogen passes through a pipe 69 to a liquefier 70 and circulates about tubes 71 therein.

The balance of the nitrogen is delivered through a pipe 72 to the coil 31 in the bottom of the column 5. After passing through the coil, the nitrogen returns through a pipe 73. A portion of the nitrogen from the pipe 72 may be diverted through a pipe 74 to the coil 54 in the bottom of the auxiliary column 41. Some of the nitrogen may be liquefied in passing through the coils 31 and 54. After passing through the coil, the nitrogen returns through a pipe 75. Nitrogen from the pipes 73 and 75 is combined in the pipe 76 and delivered to the top of the liquefier 70. Passing downwardly through the tubes 71, liquefaction of the nitrogen is completed and the liquid is withdrawn through a pipe 77 which is connected to the pipe 25 delivering liquid nitrogen to the condenser 24 and also to the pipes 35 and 46 which deliver liquid nitrogen to the condensers 33 and 45. The liquid nitrogen vaporized in condensers 33 and 45 are conducted by pipes 96' and 35' and combined in the pipe 37' which delivers these vapors to the pipe 30.

The gaseous nitrogen in the pipe 30 is also delivered to the liquefier 70 circulating about the tubes 71 therein, thus affording additional cooling medium to effect liquefaction of nitrogen in the tubes 71. A portion of the nitrogen flowing through the liquefier 70 about the tubes 71 thereof is withdrawn through a pipe 78 and delivered to the exchanger 52. After flowing through the tubes 65 thereof, it is returned by a pipe 79 to the compressor 61 and thus re-circulated in the independent nitrogen cycle. The balance of the nitrogen, after circulating about the tubes 71 of the liquefier 70, is withdrawn through a pipe 80 which delivers it to the exchanger 11. After circulating through the tubes 12 thereof, the nitrogen is withdrawn through a pipe 81 and delivered to suitable storage receptacles. This nitrogen affords the third product of the separation.

The nitrogen may be compressed in the compressor 61 to any suitable pressure adapted to afford the necessary refrigeration to maintain the cycle. This necessary refrigeration will depend upon various leakage losses and other factors. Usually it will not be necessary to compress the nitrogen to pressures as high as those frequently used in systems where the gaseous mixture under separation is utilized as the refrigerating medium, that is, 15—20 atmospheres absolute. The use of a separate nitrogen cycle for refrigeration introduces marked efficiency in the operation of the system because less expenditure of work is necessary to effect the separation.

As previously indicated, the expansion engine 68 and its connections may be omitted. Especially in smaller plants, expansion with external work may not be feasible because of the limitation of practical sizes of expansion engines and turbines adapted for the purpose. In larger plants, the use of the expansion engine is desirable since it increases the efficiency of the system.

The method as described ensures maximum recovery of the three desired constituents with minimum losses of such constituents and particularly the avoidance of contamination of the desired constituents with others. Thus, nitrogen-free argon is highly desirable for certain industrial purposes. Pure nitrogen and pure oxygen also have wide uses, and freedom from impurities is an important requirement in respect to these gases. The procedure permits the production of all three constituents in the desired purity and simultaneously.

It has been indicated that all of the cold nitrogen recovered as the effluent or by vaporization of liquid nitrogen is combined. Utilization of the refrigerative effect of this nitrogen in initially liquefying nitrogen in the independent cycle avoids the possibility of affording too much refrigeration in the incoming gaseous mixture with consequent premature liquefaction. Such liquefaction in the case of air affords liquid air, whereas efficiency of separation in accordance with the invention requires the delivery of the gaseous mixture to the tubes 16 of the condenser 15 in the gaseous phase, so that a liquid enriched in oxygen may be secured. In accordance with the present invention, the gaseous mixture enters the tubes 16 of the condenser 15 only in the gaseous phase, since premature liquefaction in the exchanger 11 is avoided.

Various changes may be made in the details of procedure and in the apparatus employed without departing from the invention or sacrificing the advantages thereof.

I claim:

1. The method of separating the constituents of ternary gaseous mixtures which comprises liquefying the gaseous mixture in two fractions by indirect heat exchange with a refrigerating liquid and thereby vaporizing the liquid, rectifying the two fractions to separate an effluent consisting of the most volatile constituent, mingling the effluent and the vaporized liquid, utilizing the mingled gases to cool and liquefy a recompressed portion thereof to afford the refrigerating liquid, utilizing the remainder of the mingled gases to cool the incoming gaseous mixture, withdrawing a vapor from the rectification consisting essentially of the other two constituents of the gaseous mixture and separating the constituents of that vapor by an auxiliary rectification.

2. The method of separating the constituents of ternary gaseous mixtures which comprises liquefying the gaseous mixture in two fractions by indirect heat exchange with a refrigerating liquid and thereby vaporizing the liquid, rectifying the two fractions to separate an effluent consisting of the most volatile constituent, mingling the effluent and the vaporized liquid, utilizing the mingled gases to cool and liquefy a recompressed portion thereof to afford the refrigerating liquid, withdrawing the remainder of the mingled gases, withdrawing a vapor from the rectification consisting essentially of the other two constituents of the gaseous mixture and separating the constituents of that vapor by an auxiliary rectification.

3. The method of separating nitrogen, oxygen and argon from air which comprises liquefying the air in two fractions by indirect heat exchange with liquid nitrogen, thereby vaporizing the liquid, rectifying the two fractions to separate an effluent consisting of nitrogen, mingling the effluent and the vaporized liquid nitrogen, utilizing the mingled gases to cool and liquefy a recompressed portion thereof to afford the liquid nitrogen, utilizing the remainder of the mingled gases to cool the incoming gaseous mixture, withdrawing a vapor from the rectification consisting essentially of oxygen and argon and separating the oxygen and argon by an auxiliary rectification.

4. The method of separating nitrogen, oxygen and argon from air which comprises liquefying the air in two fractions by indirect heat exchange with liquid nitrogen, thereby vaporizing the liquid, rectifying the two fractions to separate an effluent consisting of nitrogen, mingling the effluent and the vaporized liquid nitrogen, utilizing the mingled gases to cool and liquefy a recompressed portion thereof to afford the liquid nitrogen, withdrawing the remainder of the mingled gases as the nitrogen product, withdrawing a vapor from the rectification consisting essentially of oxygen and argon and separating the oxygen and argon by an auxiliary rectification.

5. The method of separating the constituents of ternary gaseous mixtures which comprises maintaining a refrigerating cycle by compressing and cooling a gas to provide a refrigerating liquid, vaporizing the liquid by heat exchange with the gaseous mixture whereby the latter is liquefied in two fractions, rectifying the liquid fractions to separate gaseous effluent consisting of the most volatile constituent, adding the effluent to the vapor from the refrigerating liquid, utilizing the effluent and vapor to cool and liquefy a portion thereof in the refrigerating cycle, utilizing the remainder of the effluent and vapor to cool the incoming gaseous mixture, withdrawing a vapor from the rectification consisting essentially of the other two constituents of the gaseous mixture and separating the constituents of that vapor by an auxiliary rectification.

6. The method of separating the constituents of ternary gaseous mixtures which comprises maintaining a refrigerating cycle by compressing and cooling a gas to provide a refrigerating liquid, vaporizing the liquid by heat exchange with the gaseous mixture whereby the latter is liquefied in two fractions, rectifying the liquid fractions to separate gaseous effluent consisting of the most volatile constituent, adding the effluent to the vapor from the refrigerating liquid, utilizing the effluent and vapor to cool and liquefy a portion thereof in the refrigerating cycle, withdrawing the remainder of the effluent and the vapor from the refrigerating liquid, withdrawing a vapor from the rectification consisting essentially of the other two constituents of the gaseous mixture and separating the constituents of that vapor by an auxiliary rectification.

7. The method of separating nitrogen, oxygen and argon from air which comprises, maintaining a refrigerating cycle by compressing and cooling nitrogen to provide liquid nitrogen, vaporizing the liquid nitrogen by heat exchange with air whereby the latter is liquefied in two fractions, rectifying the liquid fractions to separate a gaseous effluent consisting of nitrogen, adding the effluent to vaporized liquid nitrogen, utilizing the resulting nitrogen product to cool and liquefy a portion thereof in the refrigerating cycle, withdrawing the remainder of the nitrogen product, withdrawing a vapor from the rectification consisting essentially of oxygen and argon and separating the oxygen and argon by an auxiliary rectification.

8. The method of separating nitrogen, oxygen and argon from air which comprises, maintaining a refrigerating cycle by compressing and cooling nitrogen to provide liquid nitrogen, vaporizing the liquid nitrogen by heat exchange with air whereby the latter is liquefied in two fractions, rectifying the liquid fractions to separate a gaseous effluent consisting of nitrogen, adding the effluent to the said vaporized liquid nitrogen, utilizing the resulting nitrogen product to cool and liquefy a portion thereof in the refrigerating cycle, withdrawing the remainder of the nitrogen product, withdrawing a vapor from the rectification consisting essentially of oxygen and argon and separating the oxygen and argon by an auxiliary rectification.

CLAUDE C. VAN NUYS.

REFERENCES CITED

The following references are of record in the file of this patent:

UNITED STATES PATENTS

| Number | Name | Date |
|---|---|---|
| 2,240,925 | De Baufre | May 6, 1941 |
| 1,619,909 | Wilkinson | Mar. 8, 1927 |